(12) United States Patent
Peng et al.

(10) Patent No.: US 12,380,299 B2
(45) Date of Patent: Aug. 5, 2025

(54) SENSOR VERIFIER AND METHOD

(71) Applicant: Intel Corporation, Santa Clara, CA (US)

(72) Inventors: Yang Peng, Munich (DE); Norbert Stoeffler, Graefeling (DE); Michael Paulitsch, Ottobrunn (DE)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 17/524,977

(22) Filed: Nov. 12, 2021

(65) Prior Publication Data

US 2022/0075975 A1 Mar. 10, 2022

(51) Int. Cl.
*G06K 7/00* (2006.01)
*B25J 9/16* (2006.01)
*G06F 18/22* (2023.01)
*G06K 7/14* (2006.01)
*G06V 10/20* (2022.01)

(52) U.S. Cl.
CPC .......... *G06K 7/1417* (2013.01); *B25J 9/1697* (2013.01); *G06F 18/22* (2023.01); *G06V 10/20* (2022.01)

(58) Field of Classification Search
CPC ...... G06K 7/1417; B25J 9/1697; G06F 18/22; G06V 10/20; G06V 10/145; G06V 10/993; G06V 10/143; H04N 17/002
See application file for complete search history.

(56) References Cited

U.S. PATENT DOCUMENTS

2014/0161325 A1\* 6/2014 Bergen ................... G06V 40/10
382/117
2022/0383021 A1\* 12/2022 Hassani ................. G06V 10/60

OTHER PUBLICATIONS

Witt, Kevin et al., "A robust method for frozen frame detection in safety relevant video streams based on digital watermarking", 2017, 6 pages.
Andersen, R. S. et al., "Projecting robot intentions into human environments", IEEE, Aug. 26-31, 2016, pp. 294-301, 2016 25th IEEE International Symposium on Robot and Human Interactive Communication (RO-MAN), New York, NY, USA.
Bonarini, Andrea, "A Communication in Human-Robot Interaction", published on Aug. 27, 2020, pp. 279-285, Current Robotics Reports, vol. 1, Issue 2, Springer.
Semiconductor Components Industries, LLC; "AR0237 RGB-IR: CMOS Image Sensor, 2.1 MP, 1/2.7", RGB-IR"; https://www.onsemi.com/products/sensors/image-sensors/ar0237-rgb-ir; retrieved on Oct. 26, 2021, 4 bages.

\* cited by examiner

*Primary Examiner* — Ping Y Hsieh
(74) *Attorney, Agent, or Firm* — VIERING, JENTSCHURA & PARTNER MBB

(57) ABSTRACT

A device may include an image sensor, configured to generate image sensor data representing a vicinity of the device; an image processor, configured to generate a first code from the image sensor data using a code generation protocol; an input validity checker, configured to compare the first code to a second code; and if a similarity of the first code and the second code is within a predetermined range, operate according to a first operational mode; and if the similarity of the first code and the second code is not within the predetermined range, operate according to a second operational mode.

20 Claims, 5 Drawing Sheets

SENSOR VERIFIER AND METHOD

TECHNICAL FIELD

Various aspects of this disclosure generally relate to a device and method for verifying sensor operation.

BACKGROUND

Many devices rely on sensors to perceive their environment. Such devices may require accurate and reliable sensor information to perform their respective tasks. Their sensors, however, are vulnerable and subject to deterioration or failure, which may render their data inaccurate. For example, image sensors may become compromised through obstructions on the lens (e.g., dirt, stickers, etc.), through defects of the sensor, through sensor deterioration or aging, or through defects or deterioration of other on-sensor electronics. Moreover, such sensors, or even systems that process sensor data, may be subject to a variety of attacks, in which their sensor data may be altered or spoofed, such as through hacks that manipulate or replace altogether the sensor output data. Although these vulnerabilities may exist in a variety of configurations, such devices may be particularly vulnerable when they utilize commercial off-the-shelf (COTS) components without the necessary safety and security assurances or features. Even where the sensors operate properly, faults in the image signal processing (ISP) subsystem may also lead to unexpected control of the camera sensors or processing of the sensor data.

In such situations, the underlying system or device may be unable to discern the hacked data (e.g. an alternative data feed that diverges from data that would be captured by the actual image sensor) or data from defeated, defective, or aged sensors from accurate, valid sensor data. This can deleteriously affect performance of any device that utilizes such sensor data in its decision-making. Furthermore, since such devices may work alongside humans, their decision-making based on hacked or inaccurate sensor data may negatively affect human health and/or safety. Alternatively or additionally, their decision-making based on hacked or inaccurate sensor data may be deleterious to property.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
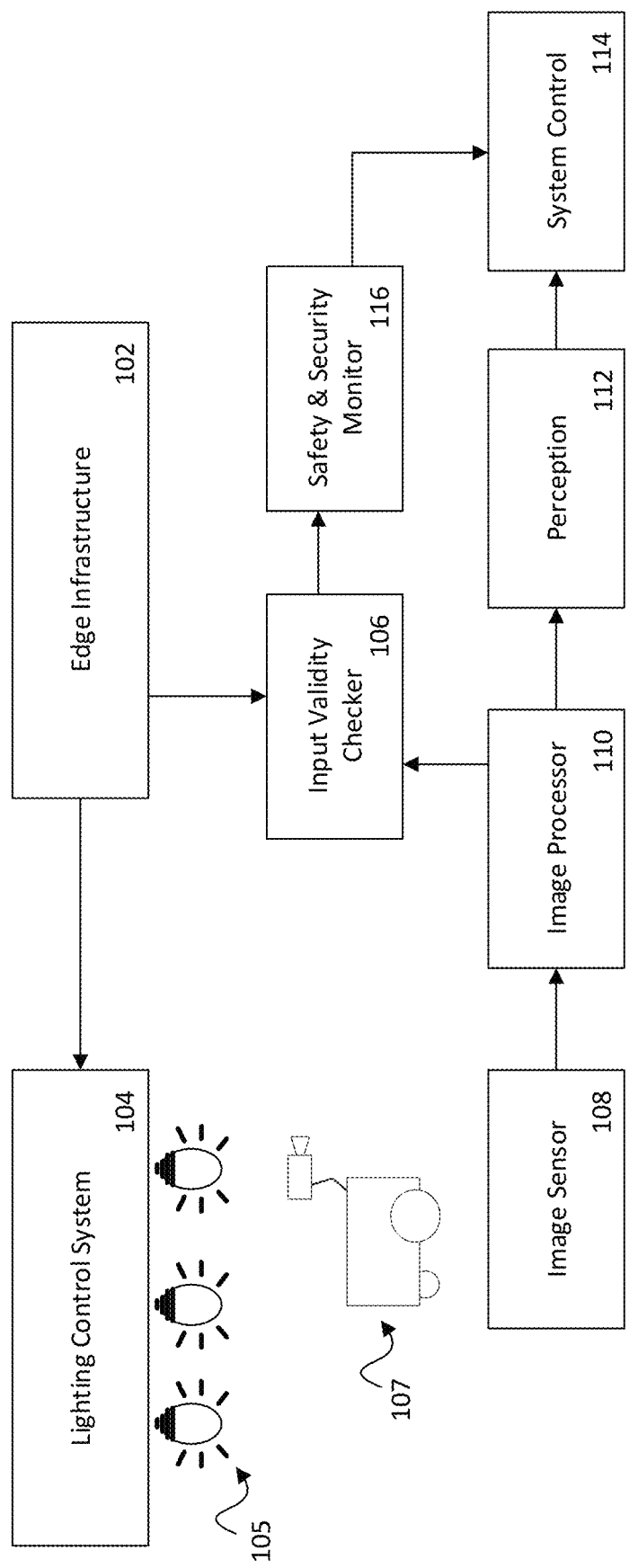
FIG. 1 depicts a safety system, configured to verify one or more image sensors.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

As stated above, devices that rely on sensor data for operation and/or decision-making may be subject to attack (e.g. hacking), deterioration, defects, or any of these. For example, in the case of an image sensor, an image sensor lens may be covered by an opacity (e.g. dirt, a sticker, etc.). In this condition, the image sensor may be unable to capture a critical event, which may result in hazards and/or property damage. Defects, deterioration, incorrect configuration, or any of these, may result in predefined patterns of sensor data being sent to a processor (e.g. "stuck" frames, "stuck" data); corresponding images from such data may be extremely bright or dark, and/or the perception system may become unable to detect a critical event using the sensor data.

Moreover, image sensors or systems that process image sensor data may be subject to malicious attack. When the image sensor output is hacked and replaced by malicious content, or the image sensor delivers defective or incorrect data, or the underlying processing system is hacked, the perception system may not be able to detect a critical event (e.g. an event that requires a particular action of the underlying device, an event that bears on human safety, an event that bears on security or integrity of property, etc.).

Previous attempts to remedy these problems have included the insertion of watermarks within image sensor data, with the goal of detecting frozen frames. Such watermarks-based efforts envision specially designed hardware components (for each device) to insert and extract watermarks from sensor data. These specially designed hardware components add significant overhead and cost to the underlying systems. In addition, practical system design constraints also limit the utility of such solutions, as the potential insertion and extraction points for the watermarks are limited (e.g., a sensor will not be covered if insertion happens after sensor output, etc.).

Herein are described strategies to improve device security and safety (e.g. for the device itself, for neighboring devices, for humans working alongside the devices, etc.) by remedying or mitigating such vulnerabilities as described above through an edge-device coordinated system. This edge device coordinated system may modulate an ambient variable (e.g. lighting, sound, etc.) in patterns that can be detected and extracted by an underlying device to be tested. Using a code generation protocol to generate a code from the extracted data, and by comparing the generated code with expected code values, this procedure can monitor and/or evaluate the validity of data being input to the device's perception systems (e.g. the sensor output, the sensor data for processing, the sensor data processing output, etc.).

According to an aspect of the disclosure, the device to be tested may be a robot. Such robots may be autonomous or semi-autonomous, in that they may be programmed to make one or more decisions based on perception data, such as data pertaining to an environment or vicinity of the device, as perceived via one or more sensors. Based at least in part on these data, such autonomous or semi-autonomous devices may change position or location (e.g. locomote along an x-axis, y-axis, or a z-axis, or any of these, perform a roll, yaw, or pitch maneuver, or otherwise change along any of the six degrees of freedom); perform an action (e.g. engage an actuator of any kind); send a command (e.g. transmit a wireless instruction); cease an action, or otherwise.

According to another aspect of the disclosure, the device to be tested may be any device that includes a processor and that performs one or more processing operations using sensor data. This may include internet of things devices, smart home devices, wearables, or otherwise.

According to an aspect of the disclosure, the relevant sensor may be an image sensor, and the sensor data may be image sensor data. In this manner, the device may include one or more image sensors that are configured to receive light from an environment of the device and to convert this received light into one or more electrical signals that represent the environment of the device. An image sensor may include a camera, a depth-camera, a Light Detection and Ranging (LIDAR) system, or any other sensor or sensors for creating an image of a surrounding of the sensor. The electrical signals may be transmitted as sensor data in analog form or may be converted to digital form, such as via an analog to digital converter. Said image sensor may be or include, but is not limited to, a charge-coupled device (CCD) and/or an active-pixel sensor (e.g. a complementary metal-oxide-semiconductor (CMOS) sensor).

According to another aspect of the disclosure, the sensor may be an audio sensor or microphone, and the sensor data may be audio sensor or microphone data. In this manner, the device may include one or more audio sensors or microphones that are configured to receive sound waves from an environment of the device and convert these received sound waves into one or more electrical signals that represent the environment of the device. The electrical signals may be transmitted in analog form or may be converted to digital form, such as via an analog to digital converter.

Throughout this disclosure, the phrase "testing pattern" or "test pattern" is used to describe a modulated ambient variable, such as an ambient lighting pattern, an ambient sound pattern, the appearance (e.g. projection) of a visual pattern, or the disappearance of a visual pattern. The testing pattern may be a temporal testing pattern or a spatial testing pattern.

A temporal testing pattern may be a testing pattern in which a factor of the environment (e.g. a factor to be detected by a sensor of the device, such as lighting or sound) changes relative to time. This may include one or more changes in lighting relative to time, such as, for example, a pattern of relative brightness and relative darkness. The relative brightness and darkness may be determined based on comparison to a predetermined threshold (e.g. a sensor value corresponding to a predetermined brightness, a light that is bright compared to a predetermined brightness value, a light that is dim compared to a predetermined brightness value), compared relative to one another (e.g. a different in perceived brightness between the bright and the dark portions of the temporal testing pattern), or otherwise. With respect to sound, this may include one or more changes in volume and/or pitch, such as loud versus soft and/or high versus low.

A spatial testing pattern may be any pattern as displayed over one or more spatial axes. For example, a spatial testing pattern may include a two-dimensional code that can be perceived by an image sensor, such as a broken line including bright segments/points and dark segments/points, or a pattern appreciable with respect to two perpendicular axes, such as across an x-axis and a y-axis. In this manner, the pattern may include a visual pattern (e.g. an image). According to an aspect of the disclosure, the visual pattern may be or include a bar code or a matrix bar code (e.g. a Quick Response Code (QR Code)).

According to an aspect of the disclosure, the testing pattern may be implemented such that it is appreciable (e.g. detectable) by machines but unappreciable (e.g. undetectable) by humans. In this manner, a lighting device implementing a visual testing pattern (e.g. a testing pattern for an image sensor) may implement the visual testing pattern by partially or exclusively utilize electromagnetic waves outside of the visual spectrum, such as infrared light. Alternatively or additionally, a speaker implementing an audio testing pattern may partially or exclusively utilize frequencies of audio waves that are undetectable by human ears. In this manner, humans working alongside the underlying devices may be undisturbed by the test patterns described herein.

A code generation protocol is used herein to describe a rubric for translating sensor data that represent a sensor detection of a testing pattern into a code. The code generation protocol may be a binary protocol, such as representing a bright image frame with a 1 and representing a dark image frame with a 0. Alternatively, the code generation protocol may be a non-binary protocol, such as a protocol that recognizes brightness in more than two ranges, such as in three ranges, in four ranges, in five ranges, or otherwise. Based on these ranges, a number (e.g. code) may be generated to represent the brightness (or dimness) of a particular frame or number of frames in a testing pattern. The number may be a simple value, such as 0 for the least brightness, 1 for the next brighter frame, 2 for the next brighter frame, and so on. Alternatively, these values may be generated in binary code, hexadecimal code, or any other method of representing a value. Alternatively or additionally, these principles may be applied to color (e.g. assigning a value to specific hues or ranges of hues), to volume (e.g. assigning a value to various volumes or ranges of volumes), or any of these.

Figure 2:
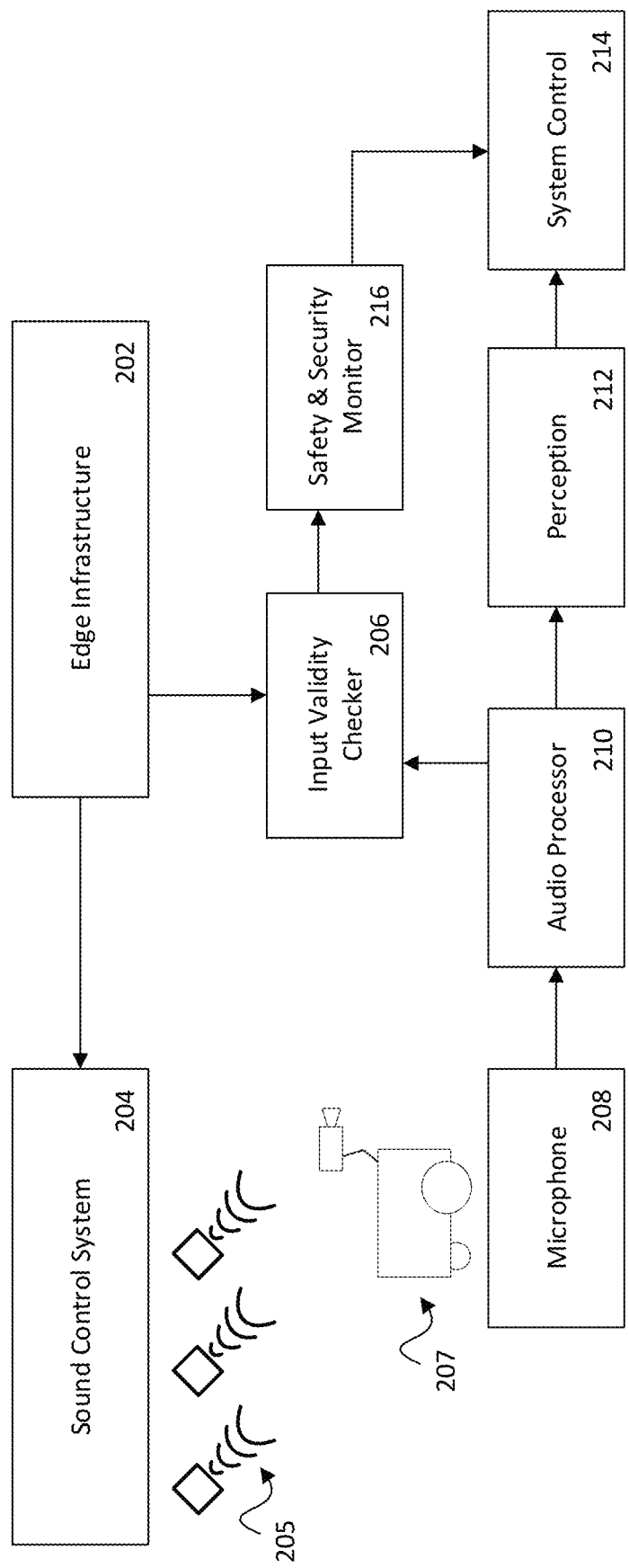
FIG. 2 depicts a safety system, configured to verify one or more audio sensors.

FIG. 1 depicts a safety system, configured to verify one or more image sensors. The safety system may be generally understood as including 3 parts: a lighting system (indicated by the lighting control system 104 and the lights 105); a testing system (indicated at least by the edge infrastructure 102), separate from the device having the sensors to be tested; and a device having one or more image sensors to be tested (indicated at least by device 107). In some configurations, the device having the sensors to be tested 107 may be configured as a robot, although the device may be any device having a processor that is configured to process image sensor data or audio sensor data. The depiction of the device 107 as a robot in FIG. 1 and FIG. 2 is for demonstrative purpose and is not intended to be limiting.

Various aspects of the configuration as depicted in FIG. 1 may be present within either the device having the one or more image sensors to be tested 107 or the edge infrastructure 102, such as the input validity checker 106 the image processor110, the safety and security monitor 116, or any of these. The edge infrastructure 102 may be alternatively referred to herein as a computer or a sensor tester.

The following will provide a description of the various elements depicted in FIG. 1 and their functions. The edge infrastructure 102 determines a testing pattern for use in sensor testing and sends a signal representing the determined testing pattern to the lighting control system 104. The testing pattern may be a temporal testing pattern (e.g. a pattern representing one or more changes relative to time), or a spatial test pattern (e.g. a visual pattern, i.e. a two-dimensional pattern). The lighting control system 104 receives the signal from the edge infrastructure 102 and controls one or more lights 105 to implement the testing pattern (e.g. depict the testing pattern, sound the testing pattern, etc.). In the case of a temporal testing pattern, implementing the testing pattern may include altering the brightness and/or color of one or more lights. In the case of a spatial testing pattern, implementing the testing pattern may include controlling one or more lights to display a visual representation of the testing pattern, such as on a surface, in three-dimensional space, or otherwise. Controlling one or more lights as used herein relative to implementation of the testing pattern may include implementing the testing pattern via one or more light emitting diodes, one or more lasers, one or more projectors, one or more screens depicting the testing pattern, or otherwise.

The device including the sensors to be tested 107, may include one or more image sensors 108, which may be configured to receive light from the one or more lights 105 and convert the received light into one or more electrical signals. That is, at least one sensor of the device 107 is configured to detect the testing pattern (e.g. to perceive the temporal pattern or to perceive the spatial pattern) and to generate an electrical signal representing the detected testing pattern. The signal representing the detected testing pattern may optionally undergo one or more conversions, such as being converted from an analogue signal to a digital signal (e.g. via an analog/digital converter), amplification, modulation for transmission, or any other kind of signal preprocessing.

The device 107 may include an image processor 110, which may be configured to receive the one or more electrical signals from the one or more sensors 108 and perform one or more signal processes on the received electrical signals. For example, the image processor 110 may optionally include an analog to digital converter, configured to generate image sensor data, such as a digital representation of the sensor output. The image processor 110 may optionally be configured to implement an auto exposure control, which may be configured to correctly adjust brightness in image sensor data; to implement a denoising procedure, such as to remove noise and thus improve clarity of the images while not causing too much blurriness, to implement a defective pixel correction, which may detect and replace defective pixels using surrounding valid pixel values.

The image processor 110 may be configured to employ a code generation protocol to generate a code based on the received sensor data, or from the image or images generated from the received sensor data. The code generated from the sensor data using the code generation protocol is referred to herein as the detected code or first code.

The system may include an input validity checker 106, which may be configured to receive a code representing the testing pattern (also referred to herein as the ideal code or the second code). The Input Validity Checker 106 may compare the second code received from the edge infrastructure 102 to the first code received from the image processor 110 and determine a validity of the first code received from the image processor 110 based on this comparison. For example, the Input Validity Checker 106 may be configured to require identity of the first code and the second code for a determination that the determined test pattern is valid. That is, upon receiving a first code from the image processor 110 that is identical to the second code as received from the edge infrastructure 102, the input validity checker 106 may determine that the first code as received by the image processor 110 is valid. Conversely, the input validity checker 106 may be configured such that any deviation between the first code as received from the image processor 110 and the second code as received from the edge infrastructure 102 results in an invalid test pattern.

Alternatively, the input validity checker 106 may be configured to determine that the first code as received from the image processor 110 is valid when the first code exhibits a similarity to the second code received from the edge infrastructure 102 beyond a predetermined threshold or within a predetermined range. For example, the first code as received from the image processor 110 may be considered valid when it is similar or substantially similar to the second code received from the edge infrastructure 102. This similarity or substantial similarity may be quantified using any known quantification measures, including, but not limited to being similar within a predetermined standard deviation or based on sum-square differences, cross-correlation, or any other method of statistical or numerical comparisons.

The Input Validity Checker 106 may be configured to output a result of its invalidity check (e.g. valid or invalid test pattern) to the safety and security monitor 116. The safety and security monitor 116 may be configured to instruct the system control 114 to perform one or more safety or security actions based on the results of the input validity checker 106. For example, the safety and security monitor 116 may be configured to instruct the system control 114 to take the underlying device 107 offline, reboot the underlying device 107, place the underlying device 107 in a safe mode, cause a system check to be performed on the underlying device 107, prompt maintenance to be performed on the underlying device 107, reestablish a connection to the underlying device 107, disable one or more functions of the underlying device 107, change a source of senor data of the underlying device 107 from the sensor that was tested to another sensor (e.g., switching the device from operating based on image sensor data to operating based on LIDAR data), sound an alarm, or any of these.

The image processor 110 may be further configured to output its image processing to the perception module 112. The perception module 112 is a known module that is primarily responsible for decision-making based on sensor data (e.g. autonomous operation functions based on sensor data). For example, the perception module 112 may make various decisions regarding movement and/or actions of the underlying device and may transmit its decisions (e.g. general instructions, specific actuator commands, or any of these) to the system control module 114. Though the detailed functions of the perception module 112 will not be described herein, as they are currently known to the skilled person, the procedures and methods described herein may be optionally implemented such that a single image processor 110 may output data to both the input validity checker 106 and the perception module 112.

According to an aspect of the disclosure, the lighting devices 105 may be configured to output light within any of the infrared or near infrared wavelengths and/or any other wavelengths that are not visible to the human eye. The lighting devices 105 that are configured to output on the nonvisible spectrum may be further configured to operate in conjunction with or alongside other lighting devices (not pictured) that may emit light within the visible spectrum. In this manner, ambient lighting provided for human use may be unaffected by the implementation of the test pattern. Rather, in addition to the unchanged ambient lighting within the visible spectrum, the lighting devices 105 that are configured to emit light in a non-visible spectrum may project or display the test pattern set that is not appreciable to human eyes. In this manner, the underlying devices (e.g. device 107) may undergo sensor testing without disturbing humans in a vicinity of the underlying devices.

In such a configuration in which the lighting devices 105 are configured to emit light within a nonvisible spectrum, the image processor 110 may be further configured to separate images within the visible spectrum from images within the non-visible spectrum. This separation may be tailored to the specific wavelengths that are utilized for the test pattern. In this manner, the image processor 110 may filter out from the image sensor data sent from image sensor 108 a first subset of wavelengths and send only the image data corresponding to this first subset of wavelengths to the input validity checker 106. For example, the testing pattern may be implemented using infrared light in an environment that also has light in wavelengths that are visible to the human eye. The image processor 110 may be configured to generate a first image (e.g. a single image, a series of images, a video) from only the infrared input to the sensor(s). The image processor 110 may be configured to generate a second image (e.g. a single image, a series of images, a video) that represents only non-infra-red data, or alternatively non-infra-red data together with infra-red-data.

According to an aspect of the disclosure, the image processor may be configured to generate the first code from the image sensor data with the code generation protocol using only the first range of electromagnetic wavelengths and not generating the first code from the image sensor data corresponding to the second range of electromagnetic wavelengths. This may be preferable over a configuration in which the image processor generates the first code both the first range and the second range of electromagnetic wavelengths in cases in which the test pattern is generated using only the first range of electromagnetic wavelengths. In this manner, generation of the test pattern can be performed without human perception, and decoding of the test pattern (e.g. generation of the first code) can be achieved without noise from the second range of electromagnetic wavelengths. Otherwise stated, if the test pattern is generated with a first range of light (e.g. infrared light), then the image processor may achieve the best results in generating the first code if it first filters out data corresponding to ranges of light outside the first range of light. In this manner, the image processor does not generate the first code using the second range of light.

Although these modules ranging from 102 to 114 are described as separate and distinct modules herein, it is expressly noted that any of these modules may be combined so as to perform the functions of one or more modules within the context of a single unit, such as on a single processor, on a single group of processors, on a single chip, on a single system on chip, within a single integrated circuit, or otherwise.

The location of certain modules of the modules ranging from 102 to 114 may vary according to the implementation. For example, it is anticipated that the lighting control system 104, the lighting devices 105, and the edge infrastructure 102 will be located external to the device to be tested 107. Similarly, it is anticipated that the image sensor 108 will be located within the device to be tested 107. Certain other modules may be located within the device to be tested 107 or external to the device to be tested 107, such as with the edge infrastructure 102.

Specifically, the image processor 110 may be conventionally located on or within the device to be tested 107. In that manner, image sensor data 108 is transferred to the image processor 110 for processing within the device to be tested 107. Alternatively, however, the image processor 110 may be located external to the device to be tested 107, such that a processor within the device to be tested 107 receives data from the image sensor 108 and controls a transmitter/modem to send the image sensor data to the image processor 110, which may be exceptionally located outside of the device to be tested 107.

The input validity checker 106 may be located within the device to be tested 107 or external to the device to be tested 107. When the input validity checker 106 is located within the device to be tested 107, the input validity checker 106 receives a first code as generated from the determined testing pattern from the image processor 110 and compares the first code with the second code as received from the edge infrastructure 102. In such a configuration, there are two possibilities for the input validity checker 106 to have knowledge of the second code from the edge infrastructure 102. The first possibility is that the edge infrastructure 102 transmits or causes to be transmitted the second code to the input validity checker 106 (e.g. such as through a wireless connection, a wired connection, or otherwise). The second possibility is that the second code representing the test pattern used by the edge infrastructure 102 is preprogrammed into the input validity checker 106. In this manner, the input validity checker will compare the first code as received by the image processor 110 (e.g. the code based on the sensor data) with the predetermined/stored second code representing the test code used by the edge infrastructure 102.

Should the input validity checker 106 be located external to the device to be tested 107, the image processor 110 may determine a first code from the image sensor data as received from the image sensor 108, and may transmit or cause to be transmitted the first code to the externally located input validity checker 106.

Moreover, the safety and security monitor 116 may be located on or within the device to be tested 107 or external to the device to be tested 107. If the safety and security monitor 116 is located on or within the device to be tested, it will receive a determination of the test pattern validity from the input validity checker 106 (in this configuration normally also located on or within the device to be tested 107) and will accordingly implement one or more corresponding safety and security actions. If the safety and security monitor 116 is located external to the device to be tested 107, the safety and security monitor will receive a validity determination from the input validity checker 106 (in this configuration potentially located on/in or external to the device to be tested 107) and will implement one or more safety and security measures accordingly.

FIG. 2 depicts procedures described in FIG. 1 with an alternative configuration in which the testing pattern is an audio testing pattern and the underlying sensors of the device to be tested 207 are/include a microphone. In this manner, the on premises edge infrastructure 202 controls a sound control system 204 to cause one or more speakers 205 to omit an audio testing pattern (e.g. a pattern including high and low sounds, loud and soft sound, etc.). The underlying device to be tested 207 includes a microphone 208, which is configured to detect audio signals including the audio testing pattern emitted from the loudspeakers 205. The microphone 208 converts sound waves of the received test pattern from the loudspeakers 205 into electrical signals, which the audio processor 210 receives. The audio processor may receive the signals in analog format or digital format and/or convert the received audio signals from analog format to digital format. The audio processor 210 may be configured to determine a first code from the detected audio testing pattern using a code generation protocol. The audio processor 210 may send the first code to the input validity checker 206. The input validity checker 206 may receive the second code from the edge infrastructure 202, or the second code may be preprogrammed within the input validity checker 206 (or the input validity checker 206 may have access to the second code, which is optionally stored within the device to be tested). The input validity checker 206 may be configured to compare the first code as received from the audio processor 210 with the second code representing the testing pattern as utilized by the on premises edge infrastructure 202 and to determine a validity or invalidity of first code, such as based on an identity of the first code and the second code, or a similarity of the first code with the second code. The process for determining an identity of the first code and the second code may be substantially similar to the statistical process described above with respect to the visual test pattern in FIG. 1.

The input validity checker 206 may send the invalidity result (e.g. invalid or valid) to the safety and security monitor 216, which may implement one or more safety and security actions based on the validity or invalidity determination. For example, the safety and security monitor 116 may be configured to instruct the system control 114 to take the underlying device 207 offline, reboot the underlying device 207, cause a system check to be performed on the underlying device 207, cause maintenance to be performed on the underlying device 207, reestablish a connection to the underlying device 207, disable one or more functions of the underlying device 207, sound an alarm, or any of these.

The audio processor 210 may optionally be connected to a perception unit 212, which may use the perceived audio information to perform one or more device actions (e.g. autonomous decision-making, autonomous control). The perception module 212 may optionally be configured to transmit instructions based on these determinations to the system control module 214.

According to an aspect of the disclosure, the audio test pattern may be transmitted on audio frequencies that are not appreciable by the human year. In this manner, the device to be tested 207 may be configured to receive only audio data on frequencies not appreciable by the human ear or receive both audio frequencies appreciable by the human year and audio frequencies not appreciable by the human ear. Should the latter be the case, the audio processor 210 may additionally, optionally be configured to filter the received audio information such that the first code is derived only from a first audio output having only audio information corresponding to frequencies not appreciable by the human ear, whereas audio information of any frequency or frequencies is then sent to the perception unit 212.

Figure 3:
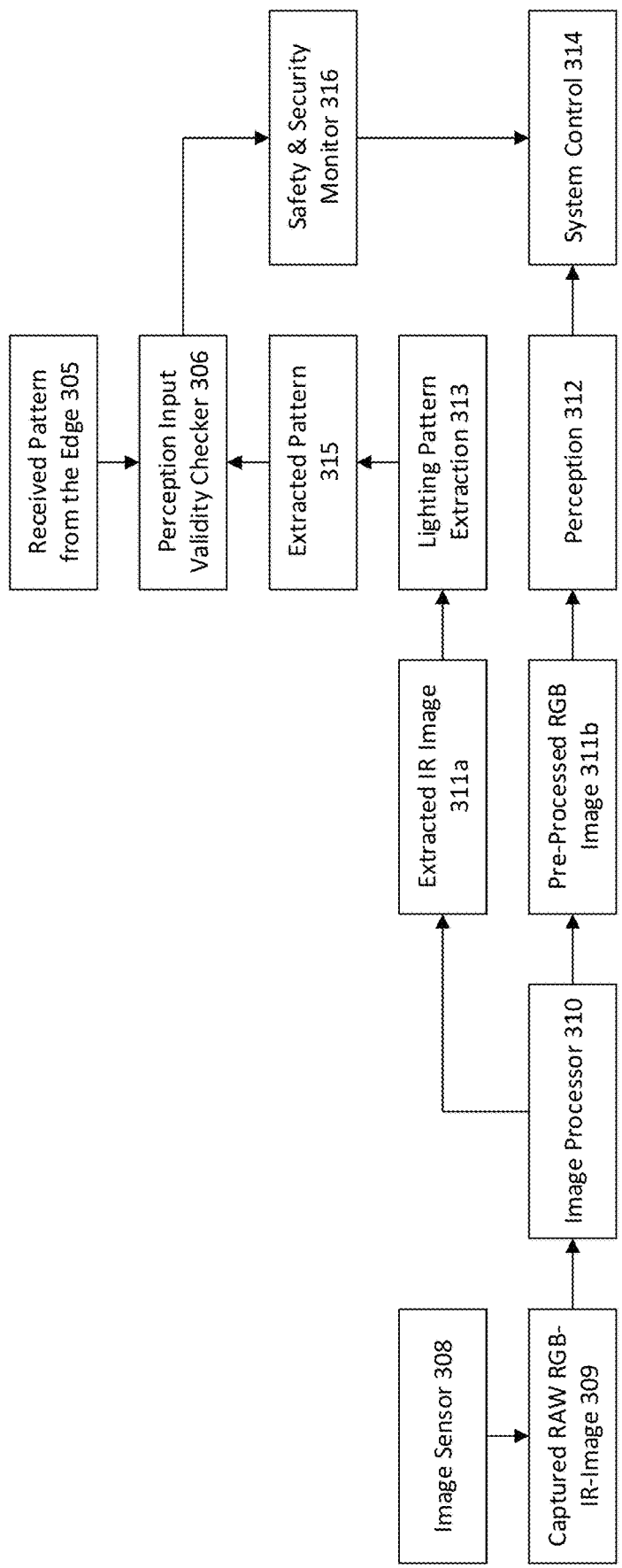
FIG. 3 depicts an alternative, more detailed configuration of the modules to implement the pattern validity determination device of FIG. 1.

FIG. 3 depicts an alternative, more detailed configuration of the modules to implement the pattern validity determination device of FIG. 1, according to an optional aspect of the disclosure. In this image, the underlying device to be tested includes an image sensor 308. The image sensor receives electromagnetic energy that it converts to an electrical signal. This electrical signal may, as an exemplary configuration, be transmitted in a combined RGB-Infrared (IR) image 309. The image processor 310 receives these image data from which the image processor 310 extracts IR data to create a first image including only data from received infrared wavelengths 311*a* (representing the first image data) and optionally a second image 311*b* (representing the second image data) which may include RGB data with infrared data or RGB data without infrared data. The perception module 312 may receive the second image data 311*b* and perform the conventional perception procedures on the image data, ultimately sending one or more decisions or commands to system control 314.

The first image 311*a* may undergo a lighting pattern extraction 313 according to the code generation protocol. This may be particularly relevant in the case of a temporal test pattern. That is, in the case of a temporal test pattern, the image data will include light frames and dark frames, and the pattern extraction according to the code generation protocol includes determining the pattern represented by the light frames and dark frames to create the first code.

After completing the lighting pattern extraction 313 (e.g. generation of the first code), the perception input validity checker 306 receives the first code. As described above, the perception input validity checker 306 receives the second code from the edge infrastructure and the extracted pattern 315 and compares the first code and the second code to determine whether a similarity of the first code and the second code is within a predetermined range.

According to one aspect of the disclosure, the similarity may necessarily be an identity of the codes. According to another aspect of the disclosure, the similarity may be within a predetermined threshold, such that small deviations of the first code from the second code may still result in a valid code generation. The perception input validity checker 306 may send the results of the validity check to the safety and security monitor 316, which may make any of a variety of decisions regarding safety and security, particular with respect to the device to be tested, and may send these decisions to system control 314.

Figure 4A:
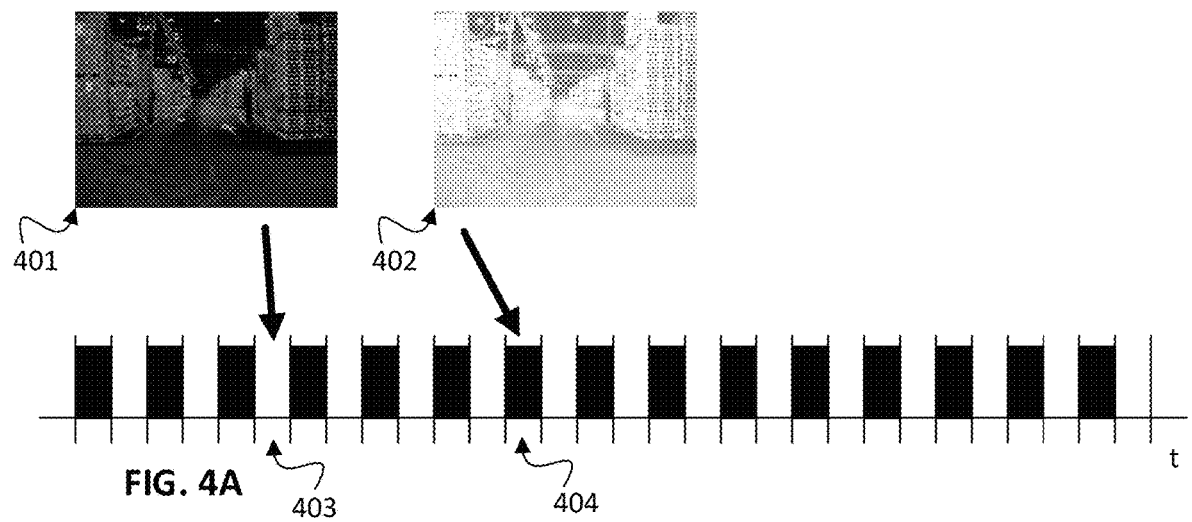
FIG. 4A depicts decoding of a temporal test pattern, such as decoding performed by the lighting pattern extraction module 313.

FIG. 4A depicts determination of the first code from sensor data using the code generation protocol, such by as decoding performed by the lighting pattern extraction module 313. In this exemplary configuration, the test pattern consists of repeated high values and low values, which correspond to an illumination magnitude. For example, the test lights (such as lights 105) may be configured to emit light on the high setting (corresponding to a high illumination magnitude) or a low setting (corresponding to a low illumination magnitude or no illumination/being turned off). The lighting pattern extraction module 313 may assess the image data relative to time to determine whether an illumination magnitude in a particular frame corresponds, for example, to a high-value or a low value, in accordance with the code generation protocol.

Turning specifically to FIG. 4A, this figure represents the detection of high illumination and low illumination within image data (e.g. video data) detected from the image sensor(s) to be tested, as exemplarily depicted in an alternating pattern. In this figure, image sensor data of a warehouse at low illumination 401 and at high illumination 402 is captured/detected. That is, the ambient lighting is altered according to the second code, and the image sensor detects the ambient lighting conditions. The image processor 310 determines whether the illumination is of a low value as in 401 (the "low" value may represent a "normal" value) or a high value 402. Regarding the graph, the horizontal axis represents time and the vertical axis represents magnitude of illumination. The specific unit of measurement along the horizontal axis is left undefined, as many implementations are possible. According to one aspect of the disclosure, each value (whether high or low) in this figure may correspond to a single frame of video data. In this manner, the first frame corresponds to a high illumination value; the second frame corresponds to a low illumination value, and so forth. According to a second aspect of the disclosure, and for purposes of decoding the test pattern from image sensor data, the sampling rate may be based on a frequency other than the frame rate (e.g. a frequency slower than the frame rate, every tenth of a second, every half a second, every second, or any other value). According to an exemplary aspect of the disclosure, the sampling rate may optionally be 30 frames per second (fps), the sampling rate may optionally be 60 fps, or the sampling rate may optionally be 120 fps.

The image processor 310 may be configured to determine the brightness of the image corresponding to the detected image sensor data and to assign a value to the image accordingly, based on the code generation protocol. For example, the brightness of image 401 is beneath a threshold value and therefore image 401 is considered "low" and attributed to a "low" value 403. Conversely, the brightness of image 402 is above a threshold value and therefore image 402 is considered "high" and attributed to a "high" value 404.

According to an aspect of the disclosure, the high and low values may be assigned a binary representation according to the code generation protocol. For example, the high illumination value may be assigned a one and the low illumination value may be assigned a zero. Applying this to the detected values in FIG. 4A, the detected pattern, which repeatedly alternates from high to low, would be assigned the following binary code: 10101010101010101010101010101010.

Figure 4B:
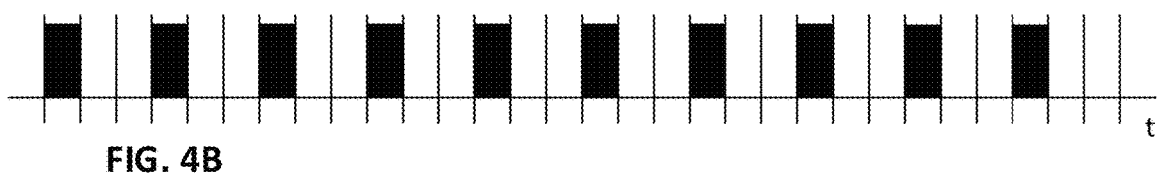
FIG. 4B depicts an alternative temporal testing pattern.

Of course, the test pattern is not limited to a mere repetition of high and low, but may rather include a pattern, a repeating pattern, or any number of different patterns. For example, FIG. 4B depicts an alternate exemplary test pattern of a repeated "high low low". The corresponding binary code is: 100100100100100100100100100100.

The testing patterns of FIG. 4A and FIG. 4B are selected only for demonstrative purposes. Any configuration of high and low signals may be selected, and the testing patterns are not limited to those of FIGS. 4A and 4B.

The lighting pattern extraction module 313 may be configured to identify the high low periods of the illumination and to generate the first code based on the code generation protocol. Of course, the cogeneration is not limited to a binary code, and many other varieties of codes are possible. For example, the illumination level could be tailored to reflect more than two illumination levels, such that the code corresponds to a high, medium, and a low illumination level. In this manner, the resulting pattern could be encoded as 012012012. Alternatively, the values may be translated into binary code, such as 00 01 10 00 01 10 00 01 10, a hexadecimal code, or otherwise.

In a configuration in which the sensor to be tested is or includes a microphone, the above principles may be easily applied to sound information. For example, sounds may be transmitted on a frequency (such as, for example, a frequency inaudible to humans), and the pattern extraction module 313 (the word "lighting" being omitted for use with an audio sensor/microphone) may be configured to determine when a high volume/high signal magnitude or a low-volume/low signal magnitude is present. A high volume may, for example, be associated with a value 1, whereas a low-volume may be associated with a value 0. The patterns of high-volume and low-volume may be alternated, as in FIG. 4A, or placed in a (repeating) pattern, as in FIG. 4B.

Because the above examples are generated relative to time, the device to be tested may require synchronization with the testing mechanism such as the edge infrastructure 102. Such synchronization may be performed through any known method of device synchronization. Once synchronization is established, the image processor 310 may optionally be configured to generate the first code only during specific periods.

A temporal code, such as for example a code depicted in FIG. 4A or 4B, may provide additional security by protecting against "stuck-at" errors as described above. That is, were the testing pattern to correspond to only a single frame (e.g. a single bright frame at a particular sample, or a single dark frame at a particular sample), it could occur that the frame on which the device was "stuck" could satisfy the requirements of the testing code. Otherwise stated, a single frame that happens to be bright might satisfy the requirement of a single bright frame or a 1. Conversely, a single frame that happens to be dark might satisfy the requirement of a single dark frame or a 0. This concept can be applied analogously to sound as well. By using a temporal testing pattern, however, in which the testing pattern includes predetermined alterations of light and dark (or loud and soft), most "stuck-at" errors will be detected.

As an extension of this concept, it is disclosed herein to optionally select alternating temporal patterns. Otherwise stated, the testing procedure described herein may be performed with a first temporal testing pattern, and then subsequently performed with a second temporal testing pattern, different from the first temporal testing pattern. In so doing, even if a stuck-at loop could satisfy the requirements of a given temporal testing pattern, it would presumably be unable to satisfy the requirements of a second temporal testing pattern, different from the first temporal testing pattern.

Figure 4C:
FIG. 4C depicts a spatial test pattern according to an aspect of the disclosure.

FIG. 4C depicts a spatial testing pattern according to an aspect of the disclosure. In this case, the testing pattern is a simple machine-readable barcode. This testing pattern may be projected within an environment of the device or devices to be tested with the expectation that the device or devices to be tested will detect the barcode in their image sensor data, process the barcode according to the methods described above, and send the detected code for code verification. At least because devices may not have their image sensors directed toward a particular surface at a given point in time, the testing pattern may be projected on multiple surfaces. Using such a testing pattern, the lighting pattern extraction module 313 may be configured to decode the barcode and transmit the decoded pattern for verification.

Figure 4D:
FIG. 4D depicts an alternative spatial test pattern according to an aspect of the disclosure.

FIG. 4D is a three-dimensional barcode (e.g. a Quick Response (QR) code), which may be used as the testing pattern according to another aspect of the disclosure. Such barcodes are commonly utilized and software is readily available for decoding such barcodes. They may be projected onto one or more surfaces in a vicinity of a device to be tested, and the device to be tested may detect the projected code and generate image data representing the QR code. In this manner, it may be possible or desirable to use any known software for QR code extraction, may be utilized to extract the relevant code from the image data and then transmit the extracted code to the perception input validity checker 306.

The above sample images for a spatial testing pattern are provided for demonstrative purposes only and are not intended to be limiting. It is possible to project nearly any image, which may then be decoded and compared to an ideal test image for verification. Alternative images may include, but are not limited to complex vector or raster images (e.g. human likenesses, a disco ball, any predetermined non-repeating pattern), projected messages, or any other text and/or graphic that can be projected onto a surface and detected.

Figure 5:
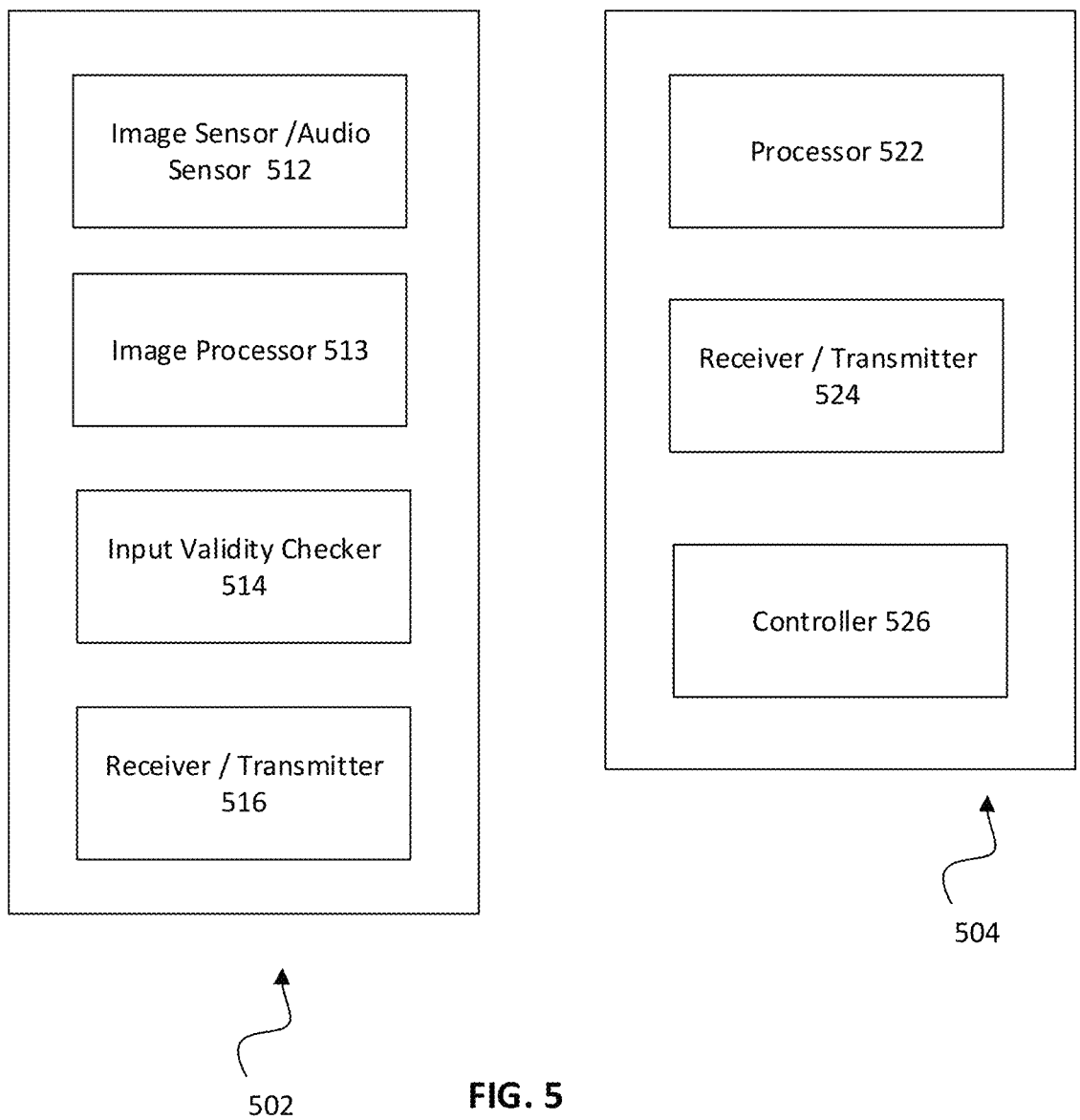
FIG. 5 depicts a system for sensor validation.

FIG. 5 depicts a system for sensor validation that includes a device to be tested 502 and a control device 504, according to a first aspect. The device to be tested 502 may include a sensor 512, configured to generate image sensor data representing a vicinity of the device; an image processor 513, configured to generate a first code from the image sensor data using a code generation protocol; and an input validity checker 514 configured to compare the first code to a second code; and if a similarity of the first code and the second code is within a predetermined range, operate according to a first operational mode; and if the similarity of the first code and the second code is not within the predetermined range, operate according to a second operational mode.

According to a second aspect, the device may be configured an autonomous or semi-autonomous robot. According to a third aspect, and in optionally in combination with the second aspect, the second code may be a preprogrammed code, stored locally on the robot. According to a fourth aspect, and optionally in combination with any of the second or third aspects, the device may further include a code generation schedule, for which the second code is valid; wherein the image processor 513 is further configured to generate the first code according to the code generation schedule. According to a fifth aspect, and optionally in combination with any of the second to the fourth aspects, the device may further include a code generation schedule, wherein the robot further includes a receiver, configured to receive a signal representing the second code; and wherein comparing the first code to the second code includes comparing the first code from the image sensor data to the second code from the received signal. According to a sixth aspect, and optionally in combination with any of the second to the fifth aspects, the processor 513 may be further configured to distinguish within the image sensor data, image sensor data corresponding to a first range of electromagnetic wavelengths from image sensor data corresponding to a second range of electromagnetic wavelengths, different from the first range of electromagnetic wavelengths, and wherein generating the first code from the image sensor data with the code generation protocol includes generating the first code from the image sensor data corresponding to the first range of electromagnetic wavelengths.

The device of the sixth aspect may optionally be combined with a seventh aspect, wherein generating the first code from the image sensor data with the code generation protocol further includes not generating the first code from the image sensor data corresponding to the second range of electromagnetic wavelengths. According to a seventh aspect, the device of the fifth aspect or the sixth aspect may be configured such that first range of electromagnetic wavelengths includes wavelengths between approximately 750 nm and 2,500 nm. According to an eighth aspect, the code generation protocol of the device of any of aspects one to seven may include assigning a first value to an image frame with a brightness above a predetermined threshold, and assigning a second value, different from the first value, to an image frame with a brightness below a threshold value. According to a ninth aspect, the device of any of aspects one to eight may be configured wherein the code generation protocol includes decoding a symbol in an image frame. According to a tenth aspect, the device of aspect none may be configured wherein the symbol includes a linear bar code or a matrix (2D) bar code. According to an eleventh aspect, the device of any of aspects one to ten may optionally be configured wherein operating according to the first operational mode includes sending a signal representing a determination that the image sensor and/or the image processor is functioning acceptably. According to a twelfth aspect, the device of any of aspects one to eleven may be optionally configured wherein operating according to the second operational mode includes sending a signal representing an impaired function of the image sensor and/or the image processor. According to a thirteenth aspect, the device of any of aspects one to twelve may be optionally configured wherein the predetermined range is identity of the first code and the second code.

According to a fourteenth aspect, the control device 504 may include a processor, configured to send a first signal representing an instruction to control a lighting device according to a second code; receive a first code from a robot, the first code representing a code generation protocol as applied to detected image sensor data; compare the first code to the second code; and if a similarity of the first code and the second code is within a predetermined range, operate according to a first operational mode; and if the similarity of the first code and the second code is not within the predetermined range, operate according to a second operational mode. According to a fifteenth aspect, the device of the fourteenth aspect may optionally be configured wherein the robot testing device further includes a receiver, and wherein receiving the first code from the robot includes wirelessly receiving a signal representing the first code via the receiver. According to a sixteenth aspect, the device of the fourteenth or fifteenth aspect may optionally be configured such that controlling the lighting device according to the second code includes controlling the lighting device to generate a temporal pattern. According to a seventeenth aspect, the device of the sixteenth aspect may optionally be configured wherein the second code includes a sequence including a first value and a second value, and wherein controlling the lighting device according to the second code includes controlling the lighting device to generate an output having a brightness above a predetermined threshold for the first value, and controlling the lighting device to generate an output having a brightness below the predetermined threshold for the second value. According to an eighteenth aspect, the device of the fourteenth or fifteenth aspects may optionally be configured such that controlling the lighting device according to a second code includes controlling the lighting device to generate a spatial pattern. According to a nineteenth aspect, the device of the eighteenth aspect may optionally be configured wherein the first code represents the code generation protocol as applied to image sensor data corresponding to the spatial pattern. According to a twentieth aspect, the device of the nineteenth aspect may optionally be configured wherein the spatial pattern includes a linear bar code or a matrix (2D) bar code. According to a twenty-first aspect, the device of any of the fourteenth to the twentieth aspects may optionally be configured wherein operating according to the first operational mode includes sending a signal representing a determination that the image sensor and/or the image processor is functioning acceptably. According to a twenty-second aspect, the device of any of the fourteenth to the twentieth aspects may optionally be configured wherein operating according to the second operational mode includes sending a signal representing an impaired function of the image sensor and/or the image processor. According to a twenty-third aspect, the device of any of the fourteenth to the twenty-second aspects may optionally be configured wherein the predetermined range is identity of the first code and the second code. According to a twenty-fourth aspect, the device of any of the fourteenth to the twenty third aspects may optionally further include a second code generation routine, configured to generate a plurality of unique second codes, and wherein the second code is any of the plurality of unique second codes.

According to an aspect of the disclosure, the edge infrastructure may generate specific patterns (e.g. test patterns) that can be modulated into the illumination (e.g. ambient lighting, the lighting devices 105) through the lighting control system 104. In many industrial configurations, devices that would benefit from the testing disclosed herein share spaces with humans. In many instances, such devices may be configured as robots that share working space with humans (e.g. such as in a warehouse or factory with both humans and robots). In such instances in which space is shared between both humans and robots, it may be preferable to perform the tests using one or more wavelengths that are invisible to the human eye (as in the case of image sensor testing) or one or more wavelengths that are inaudible to the human ear (as in the case of microphone/audio sensor testing). One option for such testing of image sensors is to utilize near infrared (NIR) lighting instead of human-visible lighting, which may avoid the unpleasant experience of having the humans' light rapidly modulating according to predetermined patterns.

According to an aspect of the disclosure, every device on the premises may be registered and logged into the edge infrastructure before it begins operation. Each device may be equipped with a sensor to be tested. In the case of an image sensor, the image sensor may be configured to capture the modulated NIR lighting (e.g., with an RGB-IR sensor), and with an image processor that can extract the NIR channel from the sensor, and with a system component that can extract the patterns from the captured NIR frames. One simplified example of such a pattern can be one bright frame, followed by two dark frames. A safety and security monitor may check the validity of the input frames though the input validity checker, which may compare the extracted pattern from the sensor with the reference pattern (ideal test pattern) received from the edge infrastructure through a safe and secure communication channel.

Should a device pass the sensor test (e.g. should the detected test pattern be identical to or at least not differ substantially from the ideal test pattern such that the first operational mode is entered), then it may be assumed that the input data to the perception sub-system is valid, and that the system is operating based on the perception outputs. On the other hand, should a device not pass the sensor test (e.g. should the detected test pattern differ from the ideal test pattern such that the second operational mode is entered) the input data to the perception sub-system may have been compromised in a critical way (either through faults or hacks). In this case, the safety and security monitor will be notified of the mismatch, and it may control the device to enter a safe state. It may also inform the edge infrastructure of the safety or security violation, so that appropriate further actions can be taken (e.g., send someone to check the device or remove the device from the premises).

As described above, the testing pattern may be temporal or spatial. A temporal pattern may advantageously be blended into the environmental lighting, such as by adding additional lights to the environment to generate the temporal pattern in wavelengths that are not visible to the human eye. Furthermore, moving objects in the testing environment, such as other robots and humans, do not typically affect the detectability of the temporal pattern (e.g. other device are unlikely to block the image sensor from detecting a temporal pattern). However, temporal patterns may be limited to simple patterns in practice, due to dependencies on how fast the vulnerability needs to be detected after it happens and the sampling rate of the sensor.

Spatial patterns, on the other hand, can be designed to be very complex. Detection based on a spatial pattern may be very fast, as the complete pattern becomes available when an image is captured. With time-varying spatial patterns, the pattern used at a specific time instance can also serve as a time stamp, which can then be used to detect critical scenarios, such as where the captured image is delayed too long before it reaches the perception sub-system. One challenge with spatial patterns, however, is to ensure that the pattern remains visible to each device (i.e., no occlusions), which may not be a trivial problem to solve in some scenarios. Extracting a complex spatial pattern and trying to match it with the reference pattern may also need more sophisticated solutions, which would lead to higher computational complexity.

According to another aspect of the disclosure, and with respect to either temporal or spatial patterns, the testing device may vary the patterns during operation time, thereby enhancing safety and security assurance. For example, from safety perspective, any "stuck-at-good" situations can also be detected with a pattern that varies over time (e.g. not merely a "temporal pattern", as used herein, but rather a system that utilized a first temporal or spatial pattern, followed by a second temporal or spatial pattern, different from the first temporal or spatial pattern). From security perspective, using time-varying patterns (i.e., "keys") is more resilient to certain security vulnerabilities such as brute-force attacks.

In the following, aspects of the disclosure will be described based by way of examples.

In Example 1, a device including an image sensor, configured to generate image sensor data representing a vicinity of the device; an processor, configured to generate a first code from the image sensor data using a code generation protocol; an input validity checker, configured to compare the first code to a second code; and if a similarity of the first code and the second code is within a predetermined range, operate according to a first operational mode; and if the similarity of the first code and the second code is not within the predetermined range, operate according to a second operational mode.

In Example 2, the device of Example 1, wherein the second code is a preprogrammed code, stored locally on the device.

In Example 3, the device of Example 2, further including a code generation schedule, for which the second code is valid; wherein the image processor is further configured to generate the first code according to the code generation schedule.

In Example 4, the device of Example 1, wherein the device further includes a receiver, configured to receive a signal representing the second code; and wherein comparing the first code to the second code includes comparing the first code from the image sensor data to the second code from the received signal.

In Example 5, the device of Example 1 or 4, wherein the image processor is further configured to distinguish within the image sensor data, image sensor data corresponding to a first range of electromagnetic wavelengths from image sensor data corresponding to a second range of electromagnetic wavelengths, different from the first range of electromagnetic wavelengths, and wherein generating the first code from the image sensor data with the code generation protocol includes generating the first code from the image sensor data corresponding to the first range of electromagnetic wavelengths.

In Example 6, the device of Example 5, wherein generating the first code from the image sensor data with the code generation protocol further includes not generating the first code from the image sensor data corresponding to the second range of electromagnetic wavelengths.

In Example 7, the device of Example 5, wherein the first range of electromagnetic wavelengths includes wavelengths between approximately 750 nm and 2,500 nm.

In Example 8, the device of any one of Examples 1 to 7, wherein the code generation protocol includes assigning a first value to an image frame with a brightness above a predetermined threshold, and assigning a second value, different from the first value, to an image frame with a brightness below a threshold value.

In Example 9, the device of any one of Examples 1 to 7, wherein the code generation protocol includes decoding a symbol in an image frame.

In Example 10, the device of Example 9, wherein the symbol includes a linear bar code or a matrix (2D) bar code.

In Example 11, the device of any one of Examples 1 to 10, wherein operating according to the first operational mode includes sending a signal representing a determination that the image sensor and/or the image processor is functioning acceptably.

In Example 12, the device of any one of Examples 1 to 10, wherein operating according to the second operational mode includes sending a signal representing an impaired function of the image sensor and/or the image processor.

In Example 13, the device of any one of Examples 1 to 12, wherein the predetermined range is identity of the first code and the second code.

In Example 14, a computing device including: a processor, configured to: send a first signal representing an instruction to control a lighting device according to a second code; receive a first code from a robot, the first code representing a code generation protocol as applied to detected image sensor data; compare the first code to the second code; and if a similarity of the first code and the second code is within a predetermined range, operate according to a first operational mode; and if the similarity of the first code and the second code is not within the predetermined range, operate according to a second operational mode.

In Example 15, the computing device of Example 14, wherein the computing device further includes a receiver, and wherein receiving the first code from the robot includes wirelessly receiving a signal representing the first code via the receiver.

In Example 16, the computing device of Example 14 or 15, wherein controlling the lighting device according to the second code includes controlling the lighting device to generate a temporal pattern.

In Example 17, the computing device of Example 16, wherein the second code includes a sequence including a first value and a second value, and wherein controlling the lighting device according to the second code includes controlling the lighting device to generate an output having a brightness above a predetermined threshold for the first value, and controlling the lighting device to generate an output having a brightness below the predetermined threshold for the second value.

In Example 18, the robot of any one of Examples 14 to 15, wherein controlling the lighting device according to a second code includes controlling the lighting device to generate a spatial pattern.

In Example 19, the computing device of Example 18, wherein the first code represents the code generation protocol as applied to image sensor data corresponding to the spatial pattern.

In Example 20, the computing device of Example 19, wherein the spatial pattern includes a linear bar code or a matrix (2D) bar code.

In Example 21, the computing device of any one of Examples 14 to 20, wherein operating according to the first operational mode includes sending a signal representing a determination that the image sensor and/or the image processor is functioning acceptably.

In Example 22, the computing device of any one of Examples 14 to 20, wherein operating according to the second operational mode includes sending a signal representing an impaired function of the image sensor and/or the image processor.

In Example 23, the computing device of any one of Examples 14 to 22, wherein the predetermined range is identity of the first code and the second code.

In Example 24, the computing device of any one of Examples 14 to 23, further including a second code generation routine, configured to generate a plurality of unique second codes, and wherein the second code is any of the plurality of unique second codes.

In Example 25, a non-transitory computer readable medium, including instructions which, if executed, cause one or more processors to: generate a first code from image sensor data using a code generation protocol; compare the first code to a second code; and if a similarity of the first code and the second code is within a predetermined range, operate according to a first operational mode; and if the similarity of the first code and the second code is not within the predetermined range, operate according to a second operational mode.

In Example 26, the non-transitory computer readable medium of Example 25, further including a code generation schedule, for which the second code is valid; wherein the instructions are further configured to cause the one or more processors to generate the first code according to the code generation schedule.

In Example 27, the non-transitory computer readable medium of Example 25, wherein comparing the first code to the second code includes comparing the first code from the image sensor data to the second code from a wirelessly-received signal.

In Example 28, the non-transitory computer readable medium of Example 25 or 27, wherein the instructions are further configured to cause the one or more processors to distinguish within the image sensor data, image sensor data corresponding to a first range of electromagnetic wavelengths from image sensor data corresponding to a second range of electromagnetic wavelengths, different from the first range of electromagnetic wavelengths, and wherein generating the first code from the image sensor data with the code generation protocol includes generating the first code from the image sensor data corresponding to the first range of electromagnetic wavelengths.

In Example 29, the non-transitory computer readable medium of Example 28, wherein generating the first code from the image sensor data with the code generation protocol further includes not generating the first code from the image sensor data corresponding to the second range of electromagnetic wavelengths.

In Example 30, the non-transitory computer readable medium of Example 28, wherein the first range of electromagnetic wavelengths includes wavelengths between approximately 750 nm and 2,500 nm.

In Example 31, the non-transitory computer readable medium of any one of Examples 25 to 30, wherein the code generation protocol includes assigning a first value to an image frame with a brightness above a predetermined threshold, and assigning a second value, different from the first value, to an image frame with a brightness below a threshold value.

In Example 32, the non-transitory computer readable medium of any one of Examples 25 to 30, wherein the code generation protocol includes decoding a symbol in an image frame.

In Example 33, the non-transitory computer readable medium of Example 32, wherein the symbol includes a linear bar code or a matrix (2D) bar code.

In Example 34, the non-transitory computer readable medium of any one of Examples 25 to 33, wherein operating according to the first operational mode includes the one or more processors sending a signal representing a determination that the image sensor and/or the image processor is functioning acceptably.

In Example 35, the non-transitory computer readable medium of any one of Examples 25 to 33, wherein operating according to the second operational mode includes the one or more processors sending a signal representing an impaired function of the image sensor and/or the image processor.

In Example 36, the device of any one of Examples 25 to 35, wherein the predetermined range is identity of the first code and the second code.

In Example 37, a non-transitory computer readable medium including instructions which, if executed, cause one or more processors to: send a first signal representing an instruction to control a lighting device according to a second code; receive a first code from an external device, the first code representing a code generation protocol as applied to detected image sensor data; compare the first code to the second code; and if a similarity of the first code and the second code is within a predetermined range, operate according to a first operational mode; and if the similarity of the first code and the second code is not within the predetermined range, operate according to a second operational mode.

In Example 38, the non-transitory computer readable medium of Example 37 or 37, wherein controlling the lighting device according to the second code includes the one or more processors controlling the lighting device to generate a temporal pattern.

In Example 39, the non-transitory computer readable medium of Example 38, wherein the second code includes a sequence including a first value and a second value, and wherein controlling the lighting device according to the second code includes the one or more processors controlling the lighting device to generate an output having a brightness above a predetermined threshold for the first value, and controlling the lighting device to generate an output having a brightness below the predetermined threshold for the second value.

In Example 40, the non-transitory computer readable medium of any one of Examples 37 to 37, wherein controlling the lighting device according to a second code includes controlling the lighting device to generate a spatial pattern.

In Example 41, the non-transitory computer readable medium of Example 40, wherein the first code represents the code generation protocol as applied to image sensor data corresponding to the spatial pattern.

In Example 42, the non-transitory computer readable medium of Example 41, wherein the spatial pattern includes a linear bar code or a matrix (2D) bar code.

In Example 43, the non-transitory computer readable medium of any one of Examples 37 to 42, wherein operating according to the first operational mode includes the one or more processors sending a signal representing a determination that the image sensor and/or the image processor is functioning acceptably.

In Example 44, the non-transitory computer readable medium of any one of Examples 37 to 42, wherein operating according to the second operational mode includes sending a signal representing an impaired function of the image sensor and/or the image processor.

In Example 45, the non-transitory computer readable medium of any one of Examples 37 to 44, wherein the predetermined range is identity of the first code and the second code.

In Example 46, the non-transitory computer readable medium of any one of Examples 37 to 45, further including a second code generation routine, configured to generate a plurality of unique second codes, and wherein the second code is any of the plurality of unique second codes.

In Example 47, a method of device testing, including: generating image sensor data representing a vicinity of a device; generating a first code from the image sensor data using a code generation protocol; comparing the first code to a second code; and if a similarity of the first code and the second code is within a predetermined range, operating according to a first operational mode; and if the similarity of the first code and the second code is not within the predetermined range, operating according to a second operational mode.

In Example 48, the method of Example 47, further including distinguishing within the image sensor data, image sensor data corresponding to a first range of electromagnetic wavelengths from image sensor data corresponding to a second range of electromagnetic wavelengths, different from the first range of electromagnetic wavelengths, and wherein generating the first code from the image sensor data with the code generation protocol includes generating the first code from the image sensor data corresponding to the first range of electromagnetic wavelengths, and wherein generating the first code from the image sensor data with the code generation protocol further includes not generating the first code from the image sensor data corresponding to the second range of electromagnetic wavelengths.

In Example 49, a device including an audio sensor, configured to generate audio sensor data from a vicinity of the device; an audio processing device, configured to: generate a first code from the audio sensor data using a code generation protocol; compare the first code to a second code; and if a similarity of the first code and the second code is within a predetermined range, operate according to a first operational mode; and if the similarity of the first code and the second code is not within the predetermined range, operate according to a second operational mode.

In Example 50, the device of Example 49, wherein the second code is a preprogrammed code, stored locally on the device.

In Example 51, the device of Example 50, further including a code generation schedule, for which the second code is valid; wherein the audio processing device is further configured to generate the first code according to the code generation schedule.

In Example 52, the device of Example 49, wherein the device further includes a receiver, configured to receive a signal representing the second code; and wherein comparing the first code to the second code includes comparing the first code from the audio sensor data to the second code from the received signal.

In Example 53, the device of Example 49, wherein the audio processing device is further configured to distinguish within the audio sensor data, audio sensor data corresponding to a first range of frequencies from audio sensor data corresponding to a second range of frequencies, different from the first range of frequencies, and wherein generating the first code from the audio sensor data with the code generation protocol includes generating the first code from the audio sensor data corresponding to the first range of frequencies, and wherein generating the first code from the audio sensor data with the code generation protocol further includes not generating the first code from the audio sensor data corresponding to the second range of frequencies.

In Example 54, the device of Example 52, wherein the first range of frequencies includes frequencies below approximately 20 Hz and/or frequencies above approximately 20 kHz.

In Example 55, the device of Example 49, wherein the code generation protocol includes assigning a first value to an audio sample with a pitch or volume above a predetermined threshold, and assigning a second value, different from the first value, to a portion of the audio sample with a pitch or volume below a threshold value.

In Example 56, the device of Example 49, wherein operating according to the first operational mode includes sending a signal representing a determination that the audio sensor is functioning acceptably, and wherein operating according to the second operational mode includes sending a signal representing an impaired function of the audio sensor.

In Example 57, the device of Example 49, wherein the predetermined range is identity of the first code and the second code.

In Example 58, the device of Example 49, wherein the device is configured as a robot.

In Example 59, a device including a processor, configured to: send a first signal representing an instruction to control a speaker according to a second code; receive a first code from a device, the first code representing a code generation protocol as applied to detected audio sensor data; compare the first code to the second code; and if a similarity of the first code and the second code is within a predetermined range, operate according to a first operational mode; and if the similarity of the first code and the second code is not within the predetermined range, operate according to a second operational mode.

In Example 60, the device of Example 59, wherein the device further includes a receiver, and wherein receiving the first code from the device includes wirelessly receiving a signal representing the first code via the receiver.

In Example 61, the device of Example 59, wherein controlling the speaker according to the second code includes controlling the speaker to generate a temporal pattern.

In Example 62, the device of Example 61, wherein the second code includes a sequence including a first value and a second value, and wherein controlling the speaker according to the second code includes controlling the speaker to generate an output having a volume or pitch above a predetermined threshold for the first value, and controlling the speaker to generate an output having a volume or pitch below the predetermined threshold for the second value.

In Example 63, the device of Example 59, wherein operating according to the first operational mode includes sending a signal representing a determination that the audio sensor is functioning acceptably, and wherein operating according to the second operational mode includes sending a signal representing an impaired function of the audio sensor.

In Example 64, the device of Example 59, wherein the predetermined range is identity of the first code and the second code.

In Example 65, the device of Example 59, further including a second code generation routine, configured to generate a plurality of unique second codes, and wherein the second code is any of the plurality of unique second codes.

In Example 66, a method of device testing, including: generating audio sensor data from vicinity of a device; generating a first code from the audio sensor data using a code generation protocol; comparing the first code to a second code; and if a similarity of the first code and the second code is within a predetermined range, operating according to a first operational mode; and if the similarity of the first code and the second code is not within the predetermined range, operating according to a second operational mode.

In Example 67, the method of Example 66, further including distinguishing within the audio sensor data, audio sensor data corresponding to a first range of frequencies from audio sensor data corresponding to a second range of frequencies, different from the first range of frequencies, and wherein generating the first code from the audio sensor data with the code generation protocol includes generating the first code from the audio sensor data corresponding to the first range of frequencies, and wherein generating the first code from the audio sensor data with the code generation protocol further includes not generating the first code from the audio sensor data corresponding to the second range of frequencies.

In Example 68, a device includes a means for generating sensor data representing a vicinity of the device; a means for generating a first code from the image sensor data using a code generation protocol; and a means for comparing the first code to a second code; wherein if a similarity of the first code and the second code is within a predetermined range, the means for comparing the first code to the second code is configured to operate according to a first operational mode; and if the similarity of the first code and the second code is not within the predetermined range, the means for comparing the first code to the second code is configured to operate according to a second operational mode.

In Example 69, the device of Example 68 includes, wherein the second code is a preprogrammed code, stored locally on the device.

In Example 70, wherein the device of Example 68 or 69 further comprises a receiving means for receiving a signal representing the second code; and wherein the means for comparing the first code to the second code is configured to compare the first code from the image sensor data to the second code received from the receiving means.

In Example 71, the device of any one of Examples 68 to 70, wherein the means for generating the first code from the image sensor data is further configured to distinguish within the image sensor data, image sensor data corresponding to a first range of electromagnetic wavelengths from image sensor data corresponding to a second range of electromagnetic wavelengths, different from the first range of electromagnetic wavelengths, and wherein generating the first code from the image sensor data with the code generation protocol comprises generating the first code from the image sensor data corresponding to the first range of electromagnetic wavelengths.

In Example 72, the device of any one of Examples 68 to 72, wherein the code generation protocol comprises the means for generating the first code from the image sensor data assigning a first value to an image frame with a brightness above a predetermined threshold, and assigning a second value, different from the first value, to an image frame with a brightness below a threshold value.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:
1. A device comprising:
   an image sensor, configured to generate image sensor data representing a vicinity of the device;
   an image processor, configured to:
      generate a first code from the image sensor data using a code generation protocol;

an input validity checker, configured to:
- compare the first code to a second code; and
  - if a similarity of the first code and the second code is within a predetermined range, operate according to a first operational mode; and
  - if the similarity of the first code and the second code is not within the predetermined range, operate according to a second operational mode;
- wherein the second code comprises a code representing a testing pattern, and wherein the testing pattern comprises a modulated ambient variable; and
- wherein the modulated ambient variable is an ambient lighting pattern, an ambient sound pattern, a projection of a visual pattern, or a disappearance of a visual pattern.

2. The device of claim 1, wherein the second code is a preprogrammed code, stored locally on the device.

3. The device of claim 2, further comprising a code generation schedule, for which the second code is valid; wherein the image processor is further configured to generate the first code according to the code generation schedule.

4. The device of claim 1, wherein the device further comprises a receiver, configured to receive a signal representing the second code; and wherein the input validity checker comparing the first code to the second code comprises the input validity checker comparing the first code from the image sensor data to the second code from the received signal.

5. The device of claim 1, wherein the image processor is further configured to distinguish within the image sensor data, image sensor data corresponding to a first range of electromagnetic wavelengths from image sensor data corresponding to a second range of electromagnetic wavelengths, different from the first range of electromagnetic wavelengths, and wherein the input validity checker generating the first code from the image sensor data with the code generation protocol comprises the input validity checker generating the first code from the image sensor data corresponding to the first range of electromagnetic wavelengths.

6. The device of claim 5, wherein the input validity checker generating the first code from the image sensor data with the code generation protocol further comprises the input validity checker not generating the first code from the image sensor data corresponding to the second range of electromagnetic wavelengths.

7. The device of claim 5, wherein the first range of electromagnetic wavelengths comprises wavelengths between approximately 750 nm and 2,500 nm.

8. The device of claim 1, wherein the code generation protocol comprises assigning a first value to an image frame with a brightness above a predetermined threshold, and assigning a second value, different from the first value, to an image frame with a brightness below a threshold value.

9. The device of claim 1, wherein the code generation protocol comprises decoding a symbol in an image frame.

10. The device of claim 1, wherein operating the input validity checker according to the first operational mode comprises sending a signal representing a determination that the image sensor and/or the image processor is functioning acceptably, and wherein the input validity checker operating according to the second operational mode comprises sending a signal representing an impaired function of the image sensor and/or the image processor.

11. The device of claim 1, wherein the predetermined range is identity of the first code and the second code.

12. The device of claim 1, wherein the device is configured as a robot.

13. A device comprising:
a processor, configured to:
- send a first signal representing an instruction to control a lighting device according to a second code;
- receive a first code from a device, the first code representing a code generation protocol as applied to detected image sensor data;
- compare the first code to the second code; and
  - if a similarity of the first code and the second code is within a predetermined range, operate according to a first operational mode; and
  - if the similarity of the first code and the second code is not within the predetermined range, operate according to a second operational mode;
- wherein the second code comprises a code representing a testing pattern, and wherein the testing pattern comprises a modulated ambient variable; and
- wherein the modulated ambient variable is an ambient lighting pattern, an ambient sound pattern, a projection of a visual pattern, or a disappearance of a visual pattern.

14. The device of claim 13, wherein the device further comprises a receiver, and wherein receiving the first code from the device comprises wirelessly receiving a signal representing the first code via the receiver.

15. The device of claim 13, wherein the processor controlling the lighting device according to the second code comprises controlling the lighting device to generate a temporal pattern.

16. A device comprising:
- a means for generating sensor data representing a vicinity of the device;
- a means for generating a first code from the sensor data using a code generation protocol; and
- a means for comparing the first code to a second code;
- wherein if a similarity of the first code and the second code is within a predetermined range, the means for comparing the first code to the second code is configured to operate according to a first operational mode; and
- if the similarity of the first code and the second code is not within the predetermined range, the means for comparing the first code to the second code is configured to operate according to a second operational mode;
- wherein the second code comprises a code representing a testing pattern, and wherein the testing pattern comprises a modulated ambient variable; and
- wherein the modulated ambient variable is an ambient lighting pattern, an ambient sound pattern, a projection of a visual pattern, or a disappearance of a visual pattern.

17. The device of claim 16, wherein the second code is a preprogrammed code, stored locally on the device.

18. The device of claim 16, wherein the device further comprises a receiving means for receiving a signal representing the second code; and wherein the means for comparing the first code to the second code is configured to compare the first code from the sensor data to the second code received from the receiving means.

19. The device of claim 16, wherein the means for generating the first code from the sensor data is further configured to distinguish within the sensor data, sensor data corresponding to a first range of electromagnetic wavelengths from sensor data corresponding to a second range of electromagnetic wavelengths, different from the first range of electromagnetic wavelengths, and wherein generating the first code from the sensor data with the code generation protocol comprises generating the first code from the sensor data corresponding to the first range of electromagnetic wavelengths.

20. The device of claim 16, wherein the code generation protocol comprises the means for generating the first code from the sensor data assigning a first value to an image frame with a brightness above a predetermined threshold, and assigning a second value, different from the first value, to an image frame with a brightness below a threshold value.

* * * * *